United States Patent
Ross et al.

(10) Patent No.: US 6,610,770 B1
(45) Date of Patent: Aug. 26, 2003

(54) ORGANOCLAY/POLYMER COMPOSITIONS WITH FLAME RETARDANT PROPERTIES

(75) Inventors: Mark Ross, Newtown, PA (US); Jacob Kaizerman, Highland Park, NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 0 days.

(21) Appl. No.: 09/411,278

(22) Filed: Oct. 4, 1999

(51) Int. Cl.$^7$ .................................................. C08K 3/34
(52) U.S. Cl. ...................................................... 524/445
(58) Field of Search ............................... 524/447, 446, 524/448, 443, 445

(56) References Cited

U.S. PATENT DOCUMENTS

| | | | | |
|---|---|---|---|---|
| 3,516,959 A | * | 6/1970 | Jonas | |
| 4,412,018 A | * | 10/1983 | Finlayson et al. | |
| 4,434,075 A | * | 2/1984 | Mardis et al. | |
| 4,472,538 A | * | 9/1984 | Kamigaito et al. | |
| 4,517,112 A | * | 5/1985 | Mardis et al. | |
| 4,546,126 A | * | 10/1985 | Breitenfellner et al. | |
| 4,582,866 A | * | 4/1986 | Shain | 524/445 |
| 4,739,007 A | * | 4/1988 | Okada | |
| 4,743,306 A | * | 5/1988 | Jepson et al. | |
| 4,777,206 A | * | 10/1988 | Rittler | |
| 5,025,057 A | * | 6/1991 | Shigemoto | |
| 5,091,462 A | * | 2/1992 | Fukui et al. | |
| 5,760,106 A | * | 6/1998 | Pinnavaia et al. | 523/209 |
| 5,801,216 A | * | 9/1998 | Pinnavaia et al. | 523/209 |
| 5,854,327 A | * | 12/1998 | Davis | |
| 6,034,163 A | * | 3/2000 | Barbee et al. | 524/445 |
| 6,071,988 A | * | 6/2000 | Barbee et al. | 524/445 |
| 6,084,019 A | * | 7/2000 | Matayabas et al. | 524/445 |
| 6,271,297 B1 | * | 8/2001 | Ishida | 523/223 |
| 6,271,298 B1 | * | 8/2001 | Powell | 523/333 |

OTHER PUBLICATIONS

Lyons "The Chemistry & Uses of Fire Retardants"—pp. 3–13, 1972.*

* cited by examiner

Primary Examiner—Peter Szekely
(74) Attorney, Agent, or Firm—Michael J. Cronin

(57) ABSTRACT

The present invention is directed to polymer compositions with flame retardant properties that are made from a polymer blended using a defined process with a smectite clay that has been reacted with a specified mixture of organic materials.

The inventive compositions have the property that when the organically modified clay is added to the polymer, a composite results which has flame-retardant properties and is based on the finding that degree of dispersion of a smectite organoclay in a polymer matrix will give the compositions flame-retardant properties. Further, it has been found that it is very important to proper functioning of the flame retardant polymer compositions that they have the organoclay dispersed in the polymer such that it is not completely exfoliated.

9 Claims, No Drawings

ORGANOCLAY/POLYMER COMPOSITIONS WITH FLAME RETARDANT PROPERTIES

BACKGROUND OF THE INVENTION

1. Field of the Invention

The present invention is directed to polymer compositions with flame retardant properties that are made from a polymer blended using a defined process with a smectite clay that has been reacted with a specified mixture of organic materials.

The inventive compositions have the property that when the organically modified clay is added to the polymer, a composite results which has flame-retardant properties.

This invention covers improved polymer compositions with increased char yield and fire retardancy. The use of organoclay is a new, environmentally-benign approach to improve the fire retardance of these polymers. Such polymers will find use, for example, as architectural and construction materials such as interior panels, home sidings, and roofing pads and shingles, automotive parts particularly for car interiors, and in ship and military uses where fire retardancy is required.

2. Background of the Invention

It has long been a goal when using plastic materials to render them resistant to burning. Building codes and other government rules issued by regulatory bodies often require that plastic materials used as structural members or other useful articles pass a series of precise tests to insure that they will not accelerate a fire. In the past, many flame retardant polymer formulations have been developed. These include several classes of materials such as halogenated additives, char chemical producers, and chemical water generators. Each of these prior art materials has its particular strengths and weaknesses as a fire retardant.

The use of synthetic polymers has grown dramatically over the last three decades, as have the research efforts of scientists on controlling polymer flammability. Research and development to that end has focused primarily on fire retardant additives. One way to improve fire resistance has relied on the introduction of aromatic rings into the polymer structure; an increase in the aromaticity yields higher char residues that normally correlate with higher oxygen index and lower flammability. The high cost of these specialized materials and the specialized processing techniques required have limited their use and makes the search for an effective additive even more focused.

The effectiveness of fire retardant fillers has also been limited because the large amounts required for effective performance make processing difficult and the additives often negatively affect some properties of the final polymer compositions. High loadings of fillers can cause problems in the plastic such as loss of strength and flexibility, and discoloration. The relatively high loading of fire retardants needed in some plastics to achieve sufficient reduction in flame spread can also be very expensive.

Particularly disadvantaged prior art materials used as fire retardants are additives containing halogens. Problems associated with these materials include high costs, high use levels, and potential environmental problems. Brominated aromatic compounds, for example, have been widely used as fire retardants for polyolefins and other thermoplastics. In addition to the poor economics of using these materials, other concerns include suspected negative environmental impact and their well-established tendency to generate corrosive by-products during processing or when exposed to fire.

These concerns have established the need for fire retardant systems for polymers with reduced halogen content. It is thus the object of the instant invention to provide a flame retardant blend comprising reduced levels of halogenated compounds.

3. Description of the Prior Art

In the past organoclays have been blended with polymers as fire retardants in circumstances where an additional fire retardant additive was used. Several general articles on polymer-clay blends have included in their discussion a section about fire retardancy—see for example Miller, B.; *Plastics World*, No.10, October 1997, pp. 36–38.

An early patent by Berk Ltd., U.S. Pat. No. 3,516,959, describes an organophilic clay used with at least one additional flame retardant. A variety of thermoplastic polymer composites is described. No attempt is made to show the effect of an organoclay by itself on flame retardancy nor how the degree of dispersion would influence this.

Several specific patents discuss clay-polymer composites in the context of fire retardance. U.S. Pat. No. 4,472,538 discloses clay treated with a chlorosilane to initiate polymerization with an adsorbed monomer to give a composite with excellent flame retardance. The use of silane initiator gives a polymer chemically bound to the clay surface. A second object of the patent is to create a uniformly dispersed polymer-clay composite. No flame testing was done to indicate the degree of flame retardance nor are there comparisons of differing levels of dispersion.

U.S. Pat. No. 5,854,327 by Bridgestone/Firestone discloses a roofing membrane that is made flame retardant by a complex mixture of ingredients. The clay component is treated to make it reactive with the EPDM rubber matrix but no specific flame-retardant properties are associated with the clay.

A General Electric patent, European Patent No. 899,301 A1, describes a non-halogenated flame retardant resin-molding polyester composition that contains organoclay, polysiloxane, and compounds of boron and phosphorus.

A number of authors have made statements in the literature that to achieve the best properties from a smectite clay-polymer composite, it is necessary to achieve the best dispersion possible. This can be described as completely exfoliating the smectite clay into individual platelets separated by the polymer matrix. It has been surmised that it is optimum that the platelets should be in insufficient contact to be chemically associated with each other. It is the fully dispersed state that is frequently held up as the ideal for all developments in the smectite clay/organoclay composite areas.

Several papers and patents explicitly mention the critical need for platelet interlayer distances to be greater than 70 Å to have complete exfoliation/delamination. These papers include: Giannelis, E. P.; *Polymer Layered Silicate Nanocomposites*. Advanced Materials 8, No. 1, pp. 29–35 (1996); and Kishnamoorti, R.; Vaia, R. A.; Giannelis, E. P.; *Structure and Dynamics of Polymer Layered Silicated Nancomposites*, Chemistry of Materials 8, No. 8, pp.1728, (1996).

Several prior art patents go into significant detail on the differences between incompletely exfoliated states and the benefits of fully delaminated clay-polymer composites. A Toyota patent, U.S. Pat. No. 4,739,007, asserts that the best improvements in mechanical properties are observed in composites with platelet spacings greater than or equal to 100 Å. It is clear from the prior literature that fully exfoliated clay-polymer systems have been the goal of researchers working in the field.

It is noted that several papers on flame-retardant polymer compositions not using organoclays show evidence that less than full exfoliation has benefits. For example, Nyden, M. R. and Gilman, J. W.; *Molecular Dynamics Simulations of the Thermal Degradation of Nano-Confined Polypropylene*, Computational and Theoretical Polymer Science, Vol. 7, No. 3/4, pp. 191–8 (1997), shows polypropylene confined by graphite. A minimum in the burning mass loss rate was calculated for polypropylene confined between the graphite sheets at 30 Å. The author did not show any experimental evidence to support the theoretical conclusions.

A United States patent based on a Japanese invention describes polymeric compositions using calcium carbonate and other materials including kaolin clays other than smectites as fire retardant additives to polymers—see U.S. Pat. No. 5,025,057. U.S. Pat. No. 5,091,462, also based on a Japanese invention, shows the addition of an inorganic filler to crystalline polypropylene to improve the heat resistance of the polypropylene in the form of a four or five ingredient resin composition. The inorganic filler can be a polyamide partially modified with hectorite.

Organically modified clays, also called organoclays, have been used for many years as rheological additives for solvent based systems. They are usually produced by making a water dispersion of a phyllosilicate clay, usually a bentonite or hectorite clay, and adding to it a quaternary ammonium salt of a long chain fatty acid to produce an organically modified clay by cation exchange reaction and adsorption. The reaction causes the organoclay to coagulate from the water dispersion which allows for its isolation by filtration and washing.

For example, Rheox, Inc. has issued patents describing organoclay compositions useful as rheological additives which comprise the reaction product of smectite clay, quaternary ammonium compounds and in addition in some embodiments certain organic anions, wherein a quaternary-organic anion complex is reacted with the smectite clay. These patents include representative U.S. Pat. Nos. 4,412,018, 4,434,075, and 4,517,112 (descriptions herein incorporated by reference) and are described to include a large variety of organic cationic compounds, in combination with one or more organic anion compounds. These patents do not describe the use of these organoclays to provide thermoset or thermoplastic polymers with fire retardant properties.

A recently allowed United States patent application by the assignee hereof (U.S. patent application Ser. No. 09/064,216, filed Apr. 22, 1998) describes a hybrid organoclay system that gives improved dispersion in a polyester resin over conventional organoclays or simple intercalates when forming a nanocomposite. See also pending U.S. patent application Ser. No. 09/317,963 filed by assignee hereto entitled Smectite Clay/Organic Chemical/Polymer Compositions Useful as Nanocomposites.

OBJECT AND SUMMARY OF THE INVENTION

Object of the Invention

It is an object of the invention to provide a modified clay/polymer composition using a thermoset or thermoplastic polymer and a smectite clay modified with organic chemicals, i.e. an organoclay. The organoclay used is dispersed into thermoset or thermoplastic polymers to form a composition with fire retardancy.

It is a specific object of the invention that the organoclay can be made inexpensively and the polymer composition in some circumstances needs no other material except the organoclay to possess acceptable fire retarding properties.

Summary of the Invention

The present invention is of a composition comprising a polymer system and a smectite clay modified with an organic chemical composition. The modified clay is an organic chemical/clay mixture prepared by the reaction of a smectite clay and one or more quaternary ammonium compounds, and/or optionally one or more organic materials. The organoclay is then blended into a polymer matrix to give the invention composition. The behavior of the resultant plastic/organoclay product is qualitatively different in fire retardant properties from that exhibited by the plastic, polymer, or resin by itself.

This invention provides a practical way to disperse organoclays based on smectite clays into polymers without resorting to expensive processes or special resin materials to insure compatibility with the polymer matrix. The resulting compositions have fire retardant properties.

In one important embodiment, we have determined that a substantial gain of fire retardancy occurs if a clay-polymer composite is produced in a way that causes the organoclay to substantially but not completely delaminate in the polymer. Testing in a thermoplastic polyolefin elastomer (TPO) has shown a strong, correlation between degree of delamination (exfoliation) of the organoclay and flame testing. By delaminate it is meant dispersed or exfoliated.

In one aspect, the present invention provides a polymer composition that comprises: (a) one or more smectite clays, modified with (1) one or more quaternary ammonium compounds at between about 50 to 150% of its cation exchange capacity, and also in some embodiments with (2) one or more defined organic materials to form an organoclay composition and (b) one or more polymer resins;

whereby the organoclay composition is mixed or blended into the polymer resin in a manner so that the organoclay is not completely delaminated.

Further advantages and features of the invention, as well as the scope, nature and utilization of the invention, will become apparent to those of ordinary skill in the art from the description of the preferred embodiment of the invention set forth below.

DESCRIPTION OF THE PREFERRED EMBODIMENTS

The clay and polymer compositions of this invention may be made using a variety of materials and by a variety of methods disclosed hereafter, or which will appear obvious when the disclosure of this patent occurs. Applicants do not intend to limit the materials or methods of manufacture or use of such additives by the following descriptions.

This invention is in one main embodiment, synthetic polymer compositions, particularly thermoset or thermoplastic compostions, which have flame-retardant properties.

The synthetic thermoset or thermoplastic polymers with which this invention is concerned (hereinafter referred to, for convenience, simply as "thermoset or thermoplastic polymers") are those which are combustible and, in addition to being combustible, which melt or drip when heated beyond their softening point.

While the flammability of these polymers can be substantially reduced by the incorporation therein of one or more flame retardants, they represent (with the use of present additives) a considerable fire hazard. When heated beyond their softening point, they will melt and hot material will drip or flow onto surrounding areas and increase the risk of ignition of surrounding materials. This can be true even when the polymer itself does not burn. Examples of thermoplastic polymers are polystyrene, polyethylene, and polyamides, such as nylon. Examples of thermoset polymers are urea-formaldehyde polymers, epoxies, and melamine-formaldehyde polymers.

The tendency of thermoplastic polymers to melt and drip when heated to temperatures above their softening points can be substantially reduced by incorporating into them a small proportion (that is, less than 10% based on the weight of the polymer) of the organically modified clay of this invention.

Synthetic polymers suitable for this invention include a wide variety of resins and plastic materials, both polar or non-polar. Such materials can include polyolefins such as polyethylenes, polypropylenes, polybutylenes, polymethylpentane, polyisoprenes, and copolymers thereof; copolymers of olefins and other monomers such as ethylene-vinyl acetate, ethylene acid copolymers, ethylene-vinyl alcohol, ethylene-ethyl acrylate, and ethylene-methyl acrylate. Ionomers are also useful and comprise metal salts of polyolefins copolymerized with acrylic acid.

Additional polymers are polyamides (nylons), polyphenylene ether, and polyamide-imide copolymers. Various polyesters are useful such as polyarylates, polybutylene terephthalate, and polyethylene terephthalate. Engineering resins such as polycarbonate, polyetherimide, polyetheretherketone, polyphenylene sulfide, and thermoplastic polyimides are suitable candidates. Polystyrene and copolymers such as ABS, SAN, ASA, and styrene-butadiene are appropriate. Also included are the sulfone based resins such as polysulfone, polyethersulfone, and polyarylsulfone. Elastomers are also candidates for the present invention and comprise a wide variety of useful materials including olefinic TPE's, polyurethane TPE's, and styrenic TPE's. Chlorinated polymers such as PVC, and polyvinylidene dichloride can also be used. In addition, miscible or immiscible blends of the above polymers are useful for this invention.

The present invention accordingly comprises a polymer composition comprising a thermoset or thermoplastic polymer, and incorporated therein, an organoclay defined hereafter.

One important aspect of the invention is a clay and polymer composition comprising:

A reaction product obtained by the intercalation and reaction of (a) one or more smectite clays; (b) one or more quaternary ammonium compounds and/or (c) one or more organic materials; which is then dispersed in a manner not to be completely exfoliated into;

(d) one or more polymers.

Clays useful for element a) are smectite clays. Such clays are swellable layered clays which contain individual platelets. Useful swellable layered materials include phyllosilicates such as smectite clay minerals, e.g., montmorillonite, particularly sodium montmorillonite; bentonite; hectorite; saponite; stevensite; beidellite; and the like.

The clays used are typically smectite clays, particularly bentonite and hectorite, Smectite clays possess some structural characteristics similar to the better-known minerals talc and mica. Their crystal structures consist of two-dimensional layers formed by fusing two silica tetrahedral sheets to an edge-shared dioctahedral or trioctahedral sheet of either alumina (for example bentonite) or magnesia (for example hectorite)—each of the different smectite clays having somewhat different structures. Stacking of these layers in nature in depths of hundreds or more is caused by ionic and weak Van der Waals forces. The area between the platelets is occupied by cations which balance the charge deficiency that is generated by isomorphous substitution (often called disharmonies) within the platelet lattices.

As used herein the term "interlayer spacing" refers to the distance between the internal faces of adjacent smectite clay platelet layers, either in the dry state or as incorporated into a polymer. The interlayer spacing is measured by standard X-Ray Diffraction techniques.

Central to the instant invention is the degree of dispersion of the organoclay in the polymer. When the organoclay is dispersed in the polymer such that only a few polymer chains are between the clay platelets, the system is referred to as being substantially intercalated. When measured by X-Ray Diffraction such a material will display an interlayer spacing of approximately 15 to 60 Å, depending on the polymer. The extreme of dispersion is exfoliation, and is defined as a state in which the clay particles are substantially or completely separated by the polymer matrix. Interlayer platelet spacings in an exfoliated system are typically greater than 70 Å, and such systems are easily characterized by X-Ray Diffraction by the near or total absence of any reflection peaks from the organoclay. As defined above, the required state of dispersion for the organoclays of this invention consists of intercalation, or a mixture of intercalation and exfoliation, but not complete exfoliation.

The clays which may be used in the present invention are preferably smectite-type clays having a cationic exchange capacity of at least 50 milliequivalents per 100 grams of clay, 100% active clay basis, as determined by the well-known ammonium acetate or methylene blue methods. Preferred smectite materials are bentonite and hectorite clays having a negative charge on the layers ranging from about 0.15 to about 0.9 charges per formula unit and a commensurate number of exchangeable metal cations in the interlayer spaces.

Smectite-type clays are well known in the art and are commercially available from a variety of sources. Prior to use in the invention, the clays may preferably be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

Representative smectite clays useful in accordance with the present invention are the following:

Montmorillonite

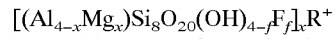

where $0.55<x<1.10$, $f<4$ and R is selected from the group consisting of Na, Li, $NH_4$, and mixtures thereof;

Bentonite

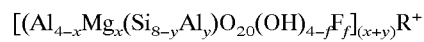

where $0<x<1.10$, $0<y<1.10$, $0.55<(x+y)<1.10$, $f<4$ and R is selected from the group consisting of Na, Li, $NH_4$, and mixtures thereof;

Hectorite

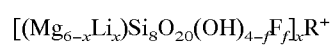

where $0.57<x<1.15$, $f<4$ and R is selected from the group consisting of Na, Li, $NH_4$, and mixtures thereof;

Saponite $[(Mg_{6-y}Al_{y})_{Si8-x-y}Al_{x+y}O_{20}(OH)_{4-f}F_f]_xR^+$ where 0.58<x<1.18, 0<y<0.66, f<4 and R is selected from the group consisting of Na, Li, NH$_4$, and mixtures thereof; and Stevensite $[Mg_{6-x}Si_8O_{20}(OH)_{4-f}F_f]_{2x}R^+$ where 0.28<x<0.57, f=4 and R is selected from the group consisting of Na, Li, NH$_4$, mixtures thereof.

Beidellite $[(Al_{4+y})(Si_{8-x-y}Al_{x+y})O_{20}(OH)_{4-f}F_f]_xF^+$ where 0.55<x<1.10, 0<y<0.44, f<4 and R is selected from the group consisting of Na, Li, NH$_4$, and mixtures thereof;

The preferred clays used in the present invention are bentonite and hectorite. Bentonite and its properties are described at length in the chapter entitled "Bentonite," in Carr, D., ed., *Industrial Minerals and Rocks*, 6th Edition, published by the Society For Mining, Metallurgy and Exploration, Colorado, 1994. A particularly preferred clay is hectorite.

It will be understood that both sheared and non-sheared forms of the above-listed smectite clays may be employed. In addition, the smectite clay employed can be either crude (containing gangue or non-clay material) or beneficiated (gangue removed). The ability to use crude clay in the smectite-type clay of this invention represents a substantial cost savings, since the clay beneficiation process and conversion to the sodium form do not have to be carried out.

Compound(s) (b) of the invention is one or more quaternary ammonium compounds. Particularly useful are quaternary ammonium compounds which include those having the formula:

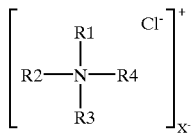

wherein R$_1$ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; R$_2$, R$_3$, and R$_4$ are independently selected from the group consisting of (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) alkoxylated groups containing from 1 to about 80 moles of alkylene oxide; (d) amide groups, (e) oxazolidine groups, (f) allyl, vinyl, or other alkenyl or alkynyl groups possessing reactive unsaturation and having from 2 to about 30 carbon atoms, and (g) hydrogen; and X' comprises an anion selected from the group consisting of chloride, methyl sulfate, acetate, iodide, and bromide, preferably chloride. For purposes of this invention, quaternary phosphonium and sulfonium based salts are defined as within the definition of quaternary ammonium compound.

The raw materials used to make the quaternary amonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halo-phenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialkyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-,3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred quaternary ammonium compounds for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

Some examples of preferred quaternary ammonium compounds to make the compositions of this invention are: dimethyl bis[hydrogenated tallow] ammonium chloride (2M2HT), methyl benzyl bis[hydrogenated tallow] ammonium chloride (MB2HT), and methyl tris[hydrogenated tallow alkyl] chloride (M3HT).

Materials suitable for optional element (c) of this invention include materials listed as anionic components in U.S. Pat. Nos. 4,412,018, 4,434,075, and 4,577,112. These include materials that are capable of reacting with component (b) of this invention and for intercalation with component (a) as an alkyl quarternary ammonium-organic anion complex. The molecular weight (gram molecular weight) of the organic anion is preferably 3,000 or less, and most preferably 1,000 or less and contains at least one anionic moiety per molecule as disclosed herein. The organic anion is preferably derived from an organic acid having a pK$_A$ less than about 11.0. As indicated, the source acid must contain at least one ionizable hydrogen having the preferred pK$_A$ in order to allow the formation of the alkyl quarternary ammonium-organic anion complex.

Exemplary types of suitable acidic functional organic compounds useful in this invention include:

(1) Carboxylic Acids Including:
   a) benzene carboxylic acids such as benzoic acid; ortho-, iso- and terephthalic acid; 1,2,3-benzenetricarboxylic acid; 1,2,4-benzenetricarboxylic acid; 1,3,5-benzenetricarboxylic acid; 1,2,4,5- benzenetetracarboxylic acid; 1,2,3,4,5,6-benzenehexacarboxylic acid (mellitic acid);

b) alkyl carboxylic acids having the formula $CH_3(CH_2)_n$—COOH, wherein n is a number from 0 to 20; such compounds include acetic acid; pentanoic acid; hexanoic acid; heptanoic acid; octanoic acid; nonanoic acid; decanoic acid; undecanoic acid; lauric acid; tridecanoic acid; tetradecanoic acid; pentadecanoic acid; hexadecanoicanoic acid; heptadecanoic acid; octadecanoic acid (stearic acid); nonadecanoic acid; eicosonic acid.

c) Alkyl dicarboxylic acids having the formula HOOC—$(CH_2)_n$—COOH wherein n is 0 to 8 such as oxalic acid; malonic acid; succinic acid; glutaric acid; adipic acid; pimelic acid; suberic acid; azelaic acid; sebacic acid;

d) Hydroxyalkyl carboxylic acids such as citric acid; tartaric acids; malic acid; mandelic acid; and 12-hydroxystearic acid;

e) unsaturated alkyl carboxylic acids such as maleic acid; fumaric acid; and cinnamic acid;

f) Fused ring aromatic carboxylic acids such as naphthalenic acid and anthracenecarboxylic acid;

g) Cycloaliphatic acids such as cyclohexanecarboxylic acid; cyclopentanecarboxylic acid; furancarboxylic acids.

(2) Organic Sulfuric Acids Including:

a) sulfonic acids including:
1) benzenesulfonic acids such as benzenesulfonic acid; phenolsulfonic acid; dodecylbenzenesulfonic acid; benzenedisulfonic acid; benzenetrisulfonic acids; para-toluenesulfonic acid; and
2) alkyl sulfonic acids such as methanesulfonic acid; ethanesulfonic acid; butanesulfonic acid; butanedisulfonic acid; sulfosuccinate alkyl esters such as dioctyl succinylsulfonic acid; and alkyl polyethoxysuccinyl sulfonic acid; and b) alkyl sulfates such as the lauryl half ester of sulfuric acid and the octadecyl half ester of sulfuric acid.
3) Organophosphorus acids including phosphonic acids, phosphinic acids, thiophosphinic acids, phosphites, and phosphates as described in U.S. Pat. No. 4,412,018
4) Phenols such as phenol; hydroquinone; t-butylcatechol; p-methoxyphenol; and naphthols.
5) Thioacids as described in U.S. Pat. No. 4,412,018.
6) Amino acids such as the naturally occurring amino acids and derivatives thereof such as 6-aminohexanoic acid; 12-aminododecanoic acid; N-phenylglycine; and 3-aminocrotonic acid.

Other materials useful for element c) can be selected from a wide variety of non-anionic materials as described in U.S. patent application Ser. No. 09/064216, descriptions herein incorporated by reference. These materials are either water soluble, liquid, or can be made into a liquid at reaction temperature so that the aforementioned clay materials absorbs them. These materials can be any of a wide range of materials and can have a wide range of molecular weights. Materials of this type suitable for element (c) of this invention include polyurethanes; polyamides; polyesters; polycarbonates; polyepoxides and polyolefins. Such materials also include polyethers (polymers and copolymers) based on ethylene oxide, butylene oxide, propylene oxide, phenols and bisphenols; polyesters (polymers and copolymers) based on aliphatic and aromatic diols and polyurethanes based on aliphatic and aromatic diisocyanates, polyamides (polymers and copolymers) based on aliphatic and aromatic diamines, and polycarbonates (polymers and copolymers) based on aliphatic or aromatic diols; polycarboimides (polymers and copolymers) based on tetrabasic acids and diamines, vinyl polymers and copolymers based on vinyl monomers, styrene and derivatives of styrene; acrylic polymers and copolymers based on acrylic monomers; copolymers based on styrene, vinyl and acrylic monomers; polyolefin polymers and copolymers based on ethylene, propylene and other alphaolefin monomers; polymers and copolymers based on dienes, isobutylenes and the like; and copolymers based on dienes, styrene, acryl and vinyl monomers. Other organic materials can include monomeric materials that have the functionality of the materials described above. The definition of element c) does not include quaternary ammonium compounds.

Specific preferred examples of useful non-anionic organic materials include THIXATROL VF-10 and THIXATROL VF-20 which are liquid polyester amide copolymers made by RHEOX. Examples of other specific materials are polyvinylpyrrolidone (PVP) or its hydrolysis product, polyvinyl alcohol (PVA), polymethacrylamide, poly(N,N-dimethylacrylamide), poly(N- isopropylacrylamide), poly(N-acetamidacryl amide), poly(N-acetimidomethacrylamide), polyvinyloxazolidone, and polyvinylmethyl oxazolidone, polyoxypropylene, polyoxyethylene and copolymers thereof.

The materials (b) and (c) can be reacted together, or in any order, with the smectite clay and the resultant product blended with the polymer to produce the inventive composition.

The amount of quaternary compound and optional organic compound used can vary over wide ranges. This amount is defined as the milliequivalent ratio which is the number of milliequivalents (m.e.) of the organic cation in the organoclay per 100 grams of clay, 100% active clay basis.

Normally, where only a quaternary is employed, at least 90 to 100 m.e. of organic cation, more typically 100 to 140 m.e. of quaternary salt based on 100 g of 100% active clay are preferred although lower and higher ratios are also useful.

It is typical that component (c), if present, is used at an amount of 5 to 100 milliequivalents, and more preferably 10 to 50 m.e., per 100g of clay, 100% active basis.

The organoclays useful in the composites of this invention may be prepared in a number of ways. One is to first disperse the smectite clay in water. The clay is preferably dispersed in water at a concentration of from about 1 to 80%, most preferably from about 2 to 8% by weight. Optionally, the slurry may be centrifuged to remove non-clay impurities that constitute about 10% to 50% of the starting clay composition. If the optional organic material is to be part of the composition, it is added to the clay/water dispersion and mixed. This mixture can then be heated and is ion exchanged with a quaternary ammonium compound to form the final organoclay as a coagulate, which is washed with water and isolated by filtration. If only the optional organic material is used, it can be added to the purified clay/water slurry an adsorbed onto the clay. The clay is then isolated by drying.

A second general method to prepare this invention uses dry clay that is intimately mixed with the organic material in a heated device, such as an extruder. The mixture can also have some water present to facilitate intercalation. After the addition is complete, the quaternary ammonium compound and/or organic material is added and the final product is isolated. This composition can be washed with water and dried.

Both of the methods mentioned above where both components (b) and (c) are used can be modified by either: 1)

reversing the order of addition, i.e., reacting the clay with the quaternary ammonium ion followed by the organic material; or 2) adding the quaternary ammonium compound and organic material to the clay simultaneously.

The reaction is preferably followed by drying and grinding the organoclay product. Incorporation of the organoclay into the plastic resin can be accomplished by mixing or blending the organoclay by any means that can create sufficient shear. The shear can be provided by any appropriate method such as mechanical, thermal shock, pressure changes, or ultrasonics as known in the art. Particularly useful are methods where a flowable polymer is mixed with the organoclay by mechanical means such as extruders, roll mills, stirrers, Banbury® type mixers, Brabender® type mixers, and continuous mixers. Other methods for making this invention can be postulated by those knowledgeable in the art.

Polymer compositions that are made by these methods using the compositions of this invention will exhibit improved fire retardancy when sufficient energy is imparted to the blend to create dispersed but not completely delaminated mixtures. This can be achieved by manipulation of various processing variables, for example: a) adjusting process temperature to raise or lower melt viscosity, b) adjusting time of processing or residence time, and c) changing machinery components such as extruder screw segments to provide a different shear processing profile.

A preferred method of determining a useful composition, as shown in the examples, is that it exhibits a discernable door peak for the smectite clay by XRD.

The preferred amounts and types of clays, quaternary ammonium compounds, organic materials, and polymers used to make the compositions of this invention will vary depending upon the type of matrix polymer that each composition is to be mixed into, with the goal to achieve incomplete delamination of the clay platelets in the matrix polymer.

In an important aspect of this invention, the milliequivalent ratio of clay to organic compound(s) is important. A preferred clay/organic chemical composition for purposes of the instant invention is comprised of:

1. The reaction product of:
   (a) a smectite-type clay having a cation exchange capacity of preferably at least 50 milliequivalents per 100 grams of clay; and
   (b) one or more quaternary ammonium compounds in an amount of from about 50% to about 150% of the cation exchange capacity of the smectite-type clay and/or
   (c) one or more organic materials in an amount of 1% to 50% of the weight of the smectite-type clay; and
2. One or more polymer resins or copolymers where the amount of organoclay from the reaction of (a), (b) and (c) above is from 0.1% to 40% of the weight of the polymer resin.

The smectite-type clay can be sheared in slurry form prior to reaction with the organic materials, or treated in solid form with a pugmill or similar apparatus.

The following examples further illustrate the invention hereof, but is not intended to limit its scope. All parts and percentages are defined without prejudice.

EXAMPLE 1

In a baffled three liter reactor with efficient stirrung was placed 1500 g of a prehydrated aqueous hectorite clay slurry (total solids 3.15%). The slurry was heated to 70° C. with stirring. A mixture of dimethyl bis(hydrogenated tallow) ammonium chloride, 35.01 g, and sodium lauryl sulfate, 4.09 g in a small amount of isopropanol was added. The reaction was mixed at temperature for 45 minutes and filtered on a large Buchner funnel. The product was washed by redispersing in 1L water and heated with stirring to 70° C., then refiltered. The resulting product was dried at 60° C. to give a moisture content below 0.5%, and ground to less than 325 mesh.

EXAMPLE 2

The organoclay from Example 1 was incorporated at 5.5% loading into a compounded TPO Elastomer formulation based on Adflex KS353P, a product of Montell, Inc. A variety of conditions was used. The resulting films were analyzed by X-Ray Diffraction and gave the following results:

TABLE I

Example 2 Results

|  | Height Ratio[1] | Area Ratio[2] | Flame Test[3] (in/min) |
|---|---|---|---|
| Unprocessed |  |  | >8 |
| Condition 1 | 6.5 | 1.2 | 3.3 |
| Condition 2 | 31.3 | 5.8 | 5.3 |
| Condition 3 | 53.8 | 9.5 | >8 |
| Condition 4 | 82.1 | 12.1 | >8 |

Condition 1: Laboratory scale 2 roll mill, 3 mins., 350° F.
Condition 2: Banbury mixer, 10 mins., 350° F.
Condition 3: Banbury mixer, 10 mins., Milled 5 mins., extruded, calendered 375° F.
Condition 4: Banbury mixer, 10 mins., Milled 5 mins., extruded, calendered 365° F.
[1]Ratio of PP 4.9Å peak (normalized to 100% full scale) to 38.4Å $d_{001}$ organoclay peak counts.
[2]Ratio of PP 4.9Å peak (normalized to 100% full scale) to 38.4Å $d_{001}$ organoclay peak areas.
[3]Flame test is UL94 HB. Pass is 4 in/min.

Discussion of Results:

Table I above shows the peak heights and areas of the $d_{001}$ reflection of the organoclay and the results of horizontal flame testing for each of the materials prepared. Peak information is expressed as the ratio to the crystalline polymer peak at 4.9 Å.

The data clearly show the correlation between the dispersion of the organoclay and the fire retardant properties of the polymer. Samples prepared under conditions 3 and 4 were subjected to significantly more shear in processing than the first two, and the delamination of the organoclay is apparent by the dramatic increase in polymer/organoclay peak heights and ratios as observed in the XRD spectrum. The samples which had a high degree of delamination performed very poorly in fire testing, while those which were less dispersed showed excellent improvement over the natural polymer resin.

The invention thus being described, it will be obvious that the same may be varied in many ways. Such variations are not to be regarded as a departure from the spirit and scope of the invention and all such modifications are intended to be included within the scope of the claims.

What is claimed:

1. A polymer composition with enhanced fire retardation qualities comprised of:
   (i) one or more organoclays which are a reaction product of:
      (a) a smectite clay modified with;
      (b) one or more quaternary ammonium compounds in an amount of from about 50% to about 150% of the cation exchange capacity of the smectite clay wherein one or more of the quaternary ammonium compounds has the formula:

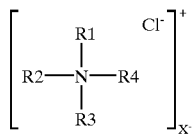

wherein $R_1$ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; $R_2$, $R_3$, and $R4$ are independently selected from the group consisting of (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) alkoxylated groups containing from 1 to about 80 moles of alkylene oxide; (d) amide groups, (e) oxazolidine groups, (f) allyl, vinyl, or other alkenyl or alkynyl groups possessing reactive unsaturation and having from 2 to about 30 carbon atoms, and (g) hydrogen; and X' comprises an anion selected from the group consisting of chloride, methyl sulfate, acetate, iodide, and bromide; and (c) one or more organic materials that are capable of intercalating with component (a) or reacting with component (c) in an amount of 1% to 50% of the weight of the smectite clay; and (ii) one or more polymers;

wherein the composition is prepared in a manner so that the organoclay is not completely delaminated into the polymer.

2. The composition of claim 1 wherein the amount of reaction and intercalation product of I(a), (b) and/or (c) is from 0.1% to 40% of the weight of the one or more polymers.

3. The composition of claim 1 wherein one or more of the organic materials is selected from the groups consisting of carboxylic acids and organic sulfuric acids.

4. The composition of claim 1 wherein one or more of the organic materials is selected from the groups consisting of polyurethanes, polyamides, polyesters, polycarbonates, polyglycols, polyepoxides and polyolefins.

5. The composition of claim 1 wherein the one or more polymers are selected from the group consisting of synthetic thermoset or thermoplastic polymers.

6. The composition of claim 1 wherein the composition is useful as an architectural or construction material.

7. The composition of claim 5 wherein the architectural material is roofing membrane or shingles.

8. The composition of claim 1 wherein the smectite clay is selected from the group consisting of bentonite, hectorite, and mixtures thereof.

9. The composition of claim 1 wherein the composition has a visible XRD $d_{001}$ peak.

* * * * *